UNITED STATES PATENT OFFICE.

OTTO ERNST HEUSCHKEL, OF VICTORIA DOCKS, ENGLAND.

MANUFACTURE OF ARTIFICIAL MANURE.

1,049,482.  Specification of Letters Patent.  Patented Jan. 7, 1913.

No Drawing.  Application filed May 20, 1911. Serial No. 628,554.

*To all whom it may concern:*

Be it known that I, OTTO ERNST HEUSCHKEL, a subject of the German Emperor, residing at No. 1A Bradfield road, Victoria Docks, in the county of Middlesex, England, have invented new and useful Improvements in and Connected with the Manufacture of Artificial Manure, of which the following is a specification.

This invention relates to improvements in artificial organic manure, which latter is very soluble in water, contains a large percentage of nitrogenous matter and moreover tannic acid is obtained as a by-product in the course of manufacture.

The present improvements apply to those known methods according to which the pulp resulting from the treatment of leather waste in an alkaline bath is dried and ground for use as a manure. Also to those methods according to which some of the tannic acid is first dissolved out of the leather cuttings or waste and the latter is subsequently treated with acid.

According to this invention leather cuttings or waste pieces are first treated in the alkaline bath and are then freed from tannic acid remaining therein by converting the latter into pyrogallic acid and carbohydrates, thereby rendering the leather soluble, after which the leather residue is reduced to the form of powder.

A suitable method of carrying out the invention is as follows, but it must be clearly understood that the ingredients (other than leather waste), the quantity or strength of such ingredients, and the method of proceeding, may be considerably varied without departing from the invention: A ton of leather cuttings or waste is soaked in 45 gallons of a hot alkaline solution consisting, for example, of 45 gallons of water and 14 pounds of caustic soda or caustic potash. The resulting alkaline liquid containing some of the tannic acid, is drawn off, filtered and neutralized by, for example, any acid or acid salt, and tannic acid is recovered in a solution of any desired density by, for instance, boiling in a vacuum. The leather which is now more or less in the form of a pulp is then according to the present improvements treated with 80 gallons of a hot acid solution, say of commercial sulfuric acid or a mixture of sulfuric and hydrochloric acids and the tannic acid remaining in the pulp is converted into gallic acid or into gallic acid and sugar or similar carbohydrate, a tough lumpy mass resulting. To prevent the development of sulfureted hydrogen, to remove other empyreumatic matter in the mass and to increase the solubility of the nitrogen contained in the mass, the latter is treated with a solution of permanganate of potash, the said solution containing as an example 18 pounds of permanganate of potash to 100 gallons of water. When the liquid has been removed or absorbed and the mass has been dried at such a temperature that the gallic acid has been converted into pyrogallic acid, the mass is ground to a fine powder and the preparation of the artificial manure is complete.

The manure may either be used dry, spread on the soil and dug or plowed in, or it may be dissolved in water and applied by spraying or watering.

The above described method of treating leather, to the step of grinding the mass, is described in my copending application Serial Number 628,553; filed even date herewith.

What I claim as my invention and desire to secure by Letters Patent of the United States is:—

1. Method of manufacturing artificial manure comprising treating leather pieces with alkaline solution to remove some of the tannic acid, and subsequently treating the leather pieces with an acid solution whereby the remaining tannic acid is converted into gallic acid and carbohydrate, and reducing the residue to a divided condition.

2. Method of manufacturing artificial manure with tannic acid as a by-product, comprising the steeping of leather pieces in a hot alkaline solution so as to remove some of the tannic acid from the leather, separating the resulting solution of tannic acid and alkali from the leather mass, treating the separated mass with acid for the conversion of the remaining tannic acid into gallic acid and carbohydrate, drying the mass, and dividing the same, substantially as described.

3. Method of manufacturing artificial manure, comprising the treating of leather pieces with acid for the conversion of the contained tannic acid into gallic acid and carbohydrates, treating the mass with permanganate of potash for the prevention of the development of sulfureted hydrogen and the removal of empyreumatic matter, the solubility of the mass being at the same time increased, drying the mass and dividing the same, substantially as set forth.

4. Method of producing artificial manure comprising the treating of leather pieces with a caustic alkali solution so as to remove some of the tannic acid in the leather, separating the solution from the mass, treating the latter with an acid solution for conversion of the remaining tannic acid into gallic acid or into carbohydrate and gallic acid, drying the mass at a temperature suitable for the conversion of the gallic acid into pyrogallic acid, and reducing the dried mass to a powder, substantially as set forth.

5. The artificial manure consisting of dry powdered leather containing permanganate of potash and small quantities of pyrogallic acid and carbohydrates, substantially as set forth.

In testimony whereof I have signed my name to this specification in the presence of two subscribing witnesses.

OTTO ERNST HEUSCHKEL.

Witnesses:
  W. MORBEY,
  R. WILSON.

---

Copies of this patent may be obtained for five cents each, by addressing the "Commissioner of Patents, Washington, D. C."